United States Patent Office 3,719,114
Patented Mar. 6, 1973

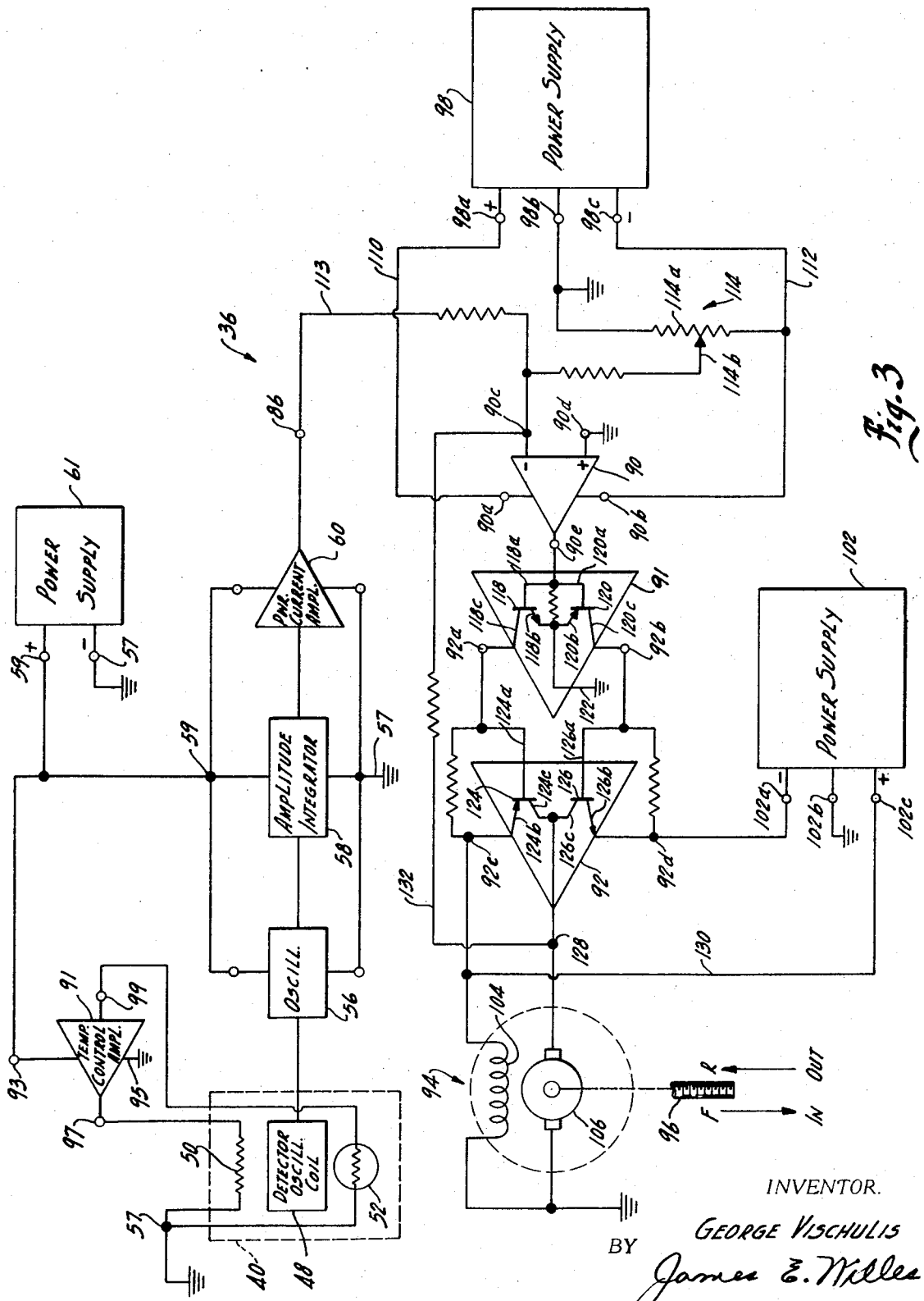

3,719,114
WEB TRIMMER CONTROL
George Vischulis, W172 N9409 Shady Lane,
Menomonee Falls, Wis. 53240
Filed Oct. 29, 1971, Ser. No. 193,637
Int. Cl. B23d 19/00
U.S. Cl. 83—74                                  11 Claims

ABSTRACT OF THE DISCLOSURE

Apparatus and control means therefor for trimming excess material from the edges of a tire web having a multiplicity of steel wires embedded between two laminated sheets of rubber and running parallel to the edge comprises: a trimming blade for cutting excess material from the edge, a detector head including an oscillator coil located downstream of the blade and adjacent to the trimmed edge of the web for sensing the location of the outermost wire. Both the blade and the detector head are mounted in fixed positions on a supporting structure or carriage which is adjustably movable transversely to the web so the blade can maintain a constant dimension between the outermost wire and the trimmed edge of the web. The carriage is movable by a screw drive mechanism which is powered by a servo-motor. An oscillator circuit energizes the oscillator coil in the detector head and changes in amplitude of coil oscillation voltage caused by lateral movement of the outermost wire toward or away from the detector head (indicating a change in the desired constant dimensions) are sensed by a detector circuit, integrated and amplified to provide control signals representative of dimensional changes and employed to control energization of the servo-motor to move the carriage and maintain a constant distance between the blade and the outermost wire.

BACKGROUND OF THE INVENTION

Field of the invention

This invention relates generally to web-trimming apparatus for trimming the edges of webs of material having wires or cords embedded therein. In particular, it relates to control means for such apparatus wherein detector means sense wire position and effect positioning of trimming blades so that the blades track at a predetermined distance from the wires.

Description of the prior art

In the manufacture of automotive tires, for example, which have steel tire cords embedded therein, it is necessary at one stage of manufacture to provide a continuous web which comprises a laminate of two thin sheets of rubber with a multiplicity of parallel continuous steel wires or strands sandwiched between them. One step in the manufacture of this web involves trimming excess rubber from both edges of the laminate in such a way that a close and exact dimension is maintained between the outermost steel cords and the finally-trimmed edges of the web. Such trimming is usually accomplished by slitting means, such as a pair of trimming knives or blades (one for each edge), against which the web is drawn. In some installations, an operator, observing whether the required dimension is being maintained, continually adjusts the blades laterally with respect to the web. In other systems using automatic control, the blades are moved automatically so as to track a predetermined distance from the outermost wires in response to detecting means which sense the positions of the outermost strands of wire in the web. Heretofore, it was the practice to use detecting means, such as Hall-effect detection devices, and to locate such detection devices upstream of the blades and either above the outermost wires or alongside the untrimmed edges of the web. However, because detection devices of this type have a sensitivity which is inversely proportional to the square of the distance between them and the wire to be sensed, several difficulties arose. For example, if located alongside the untrimmed edge, which is usually quite wide, the detection device is so far away from the outermost wire that sensitivity is lost and, also, the detection device may then respond to inductive effects resulting from erratic spacing between the outermost wire and the adjacent wires, as well as extraneous matter brought into the field of the detection device. On the other hand, if the detection device is located in close proximity above or below the outermost wire, sensitivity increases but the device may then accidentally respond to wires adjacent to the outermost wire or even be undesirably sensitive to the vertical gap between it and the outermost wire.

It is desirable, therefore, to provide improved web-trimming apparatus and control means therefor which avoid the above-described disadvantages and have other advantages.

SUMMARY OF THE INVENTION

Web-trimming apparatus and control means therefor in accordance with the invention are used to trim excess material from the edges of a web of material, such as rubber, which has a plurality of closely-spaced electrically-conductive steel wires or cords embedded therein in parallel relationship to the web edges. The web-trimming apparatus comprises slitting means including a pair of trimming knives or blades (one for each edge) for trimming excess material from the edges and further includes means for drawing or moving the web relative to the blades to effect cutting or slitting. Each blade is mounted on a supporting structure or blade carriage which is independently movable or adjustable laterally with respect to the web so as to maintain a constant predetermined dimension between the trimmed edge and the wire closest to that edge. The control means for the web-trimming apparatus determines the relative position of each blade with respect to its associated outermost wire and moves or adjusts the blade carriage laterally to maintain the aforesaid constant predetermined dimension. The control means includes a separate control system for each blade carriage. Each control system comprises detector means, such as a detector head having an oscillator coil therein which oscillates at a certain frequency, on its respective blade carriage and located ahead of the blade so that it is adjacent the trimmed edge of the web. Each control system further comprises circuit means to sense variations in amplitude of the oscillator coil voltage (caused by changes in distance between the detector head and the outermost wire) and to integrate these amplitude changes into amplified control signals corresponding to changes in the distance between the detector head and the outermost wire requiring a corrective movement of the blade carriage so as to maintain the dimension between the trimmed edge and the outermost wire. More specifically, the oscillator coil is energized by an oscillator circuit to oscillate at a certain frequency and undergoes a change in its electrical amplitude of oscillation as the outermost wire moves laterally towards or away from the coil. This change in amplitude is sensed by an amplitude integrator circuit and converted into amplified control signals indicative of distance. Each control system also includes drive means for receiving the control signals and for utilizing them to direct the blade carriage and blade to proper cutting position. Such means include a servo-drive circuit, a servo-motor, and a screw drive mechanism driven by the servo-motor for moving the blade carriage laterally.

In practice, the detector head is held at a first predetermined distance from the side of the outermost wire and the blade is held a second predetermined distance from the side of the outermost wire, although both the detector head and the blade are mounted in fixed position on the carriage. Thus, both the detector head and the blade travel the same distance when the carriage moves.

In further accordance with the invention, the detector head comprises a heater coil for maintaining the oscillator coil at a constant temperature well above ambient so that its frequency and amplitude are not affected by changes in ambient temperature. The detector head also includes a heat-sensing device such as a thermistor for regulating the power to the heating coil.

The present invention permits extremely close proximity between the oscillator coil and the wire which is to be sensed, thereby resulting in greater sensitivity to wire location and greater accuracy of control of blade position. Furthermore, the arrangement for mounting the detector means is such that lateral shifting or slewing of the moving web will not touch or cause physical damage to the detector means or the sensitive coil therein. Also, the invention is suitable for high-speed operation while at the same time being less susceptible to errors.

BRIEF DESCRIPTION OF THE DRAWINGS

FIG. 3 is a schematic diagram of one control system of the control means shown in FIG. 1.

DESCRIPTION OF THE PREFERRED EMBODIMENT

Figure 1:
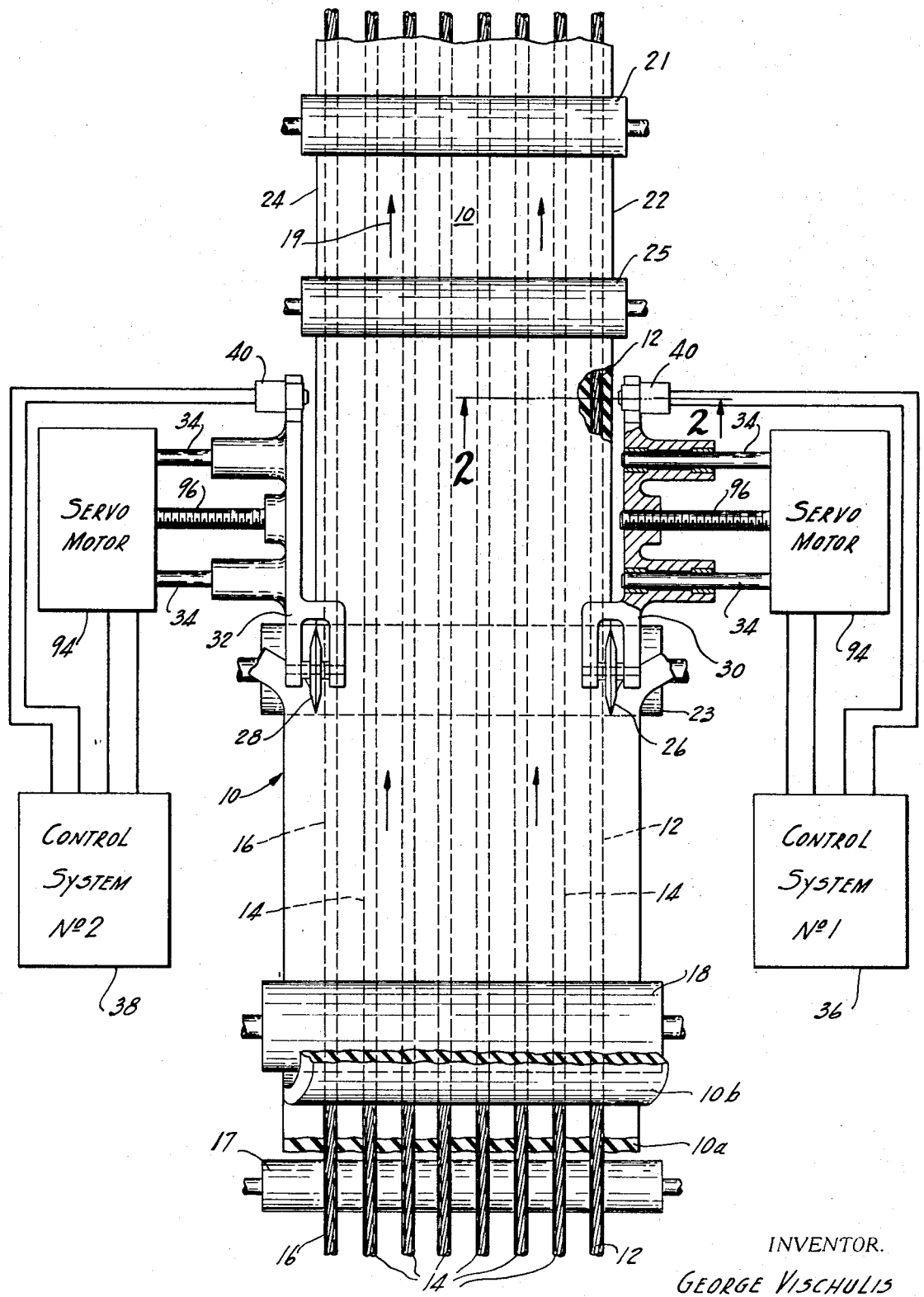
FIG. 1 is a schematic showing of web-trimming apparatus and control means therefor in accordance with the invention.
Figure 2:
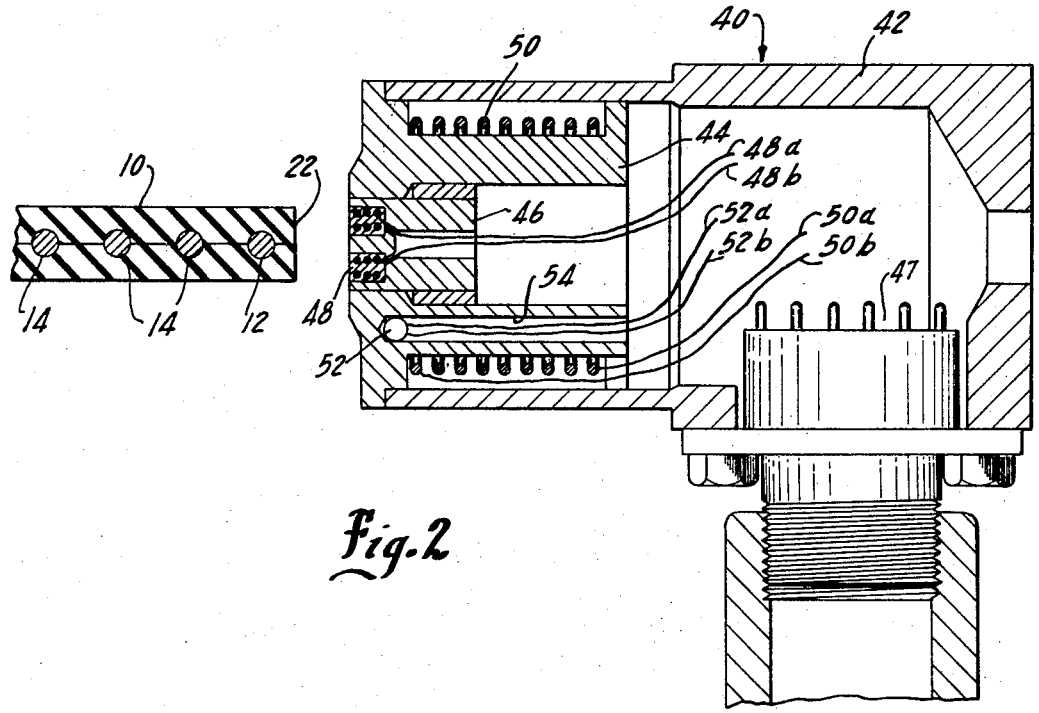
FIG. 2 is an enlarged cross-section view of a portion of the web and a detector head taken along line II—II of FIG. 1.

Referring to FIG. 1 of the drawing, there is shown web-trimming apparatus and control means therefor for trimming the edges of a web 10 in which a plurality of parallel steel wires or cords designated 12, 14 and 16 are embedded. Web 10 is formed by drawing or pulling two layers 10a and 10b of web rubber and the steel wires 12, 14 and 16 through a pair of calendar rollers 18 which compress and bond the two layers with the wires therebetween. The wires 12, 14 and 16 are guided for proper spacing by a guide roller 17. Web 10 is drawn or advanced in the direction of arrow 19 through calendar rollers 18 by means of a pull roller 21. In practice, web 10 is on the order of 4 feet wide and ⅛ inch thick. Referring to FIGS. 1 and 2, the wires 12, 14 and 16 are understood to be formed of stranded brass-coated steel and each is on the order of 1/32 inch in diameter. Each wire is spaced about .06 inch from an adjacent wire. It is desired, for example, that the outermost wires 12 and 16 be spaced about .025 inch from trimmed edges 22 and 24 of web 10.

As FIG. 1 shows, the web-trimming apparatus comprises a slitting anvil roller 23 over which web 10 passes and a pass-line roller 25 beneath which web 10 passes. The web-trimming apparatus also comprises slitting means such as two trimming blades or knives 26 and 28 which are mounted on supporting structures or blade carriages 30 and 32, respectively. It is to be understood that each carriage 30 and 32 is independently movable laterally. As FIG. 1 shows, carriage 30 is supported by and slidable on a pair of rods 34 and carriage 32 is similarly mounted. The blades 26 and 28, which are circular in form, cooperate with slitting anvil roller 23 but do not rotate while they perform a cutting or slitting operation. However, the blades 26 and 28 are rotated periodically so as to present a sharp cutting edge to web 10. In operation of the trimming apparatus, it is desirable to maintain each blade 26 and 28 a constant predetermined distance from the outermost wires 12 and 16, respectively, so as to maintain a constant predetermined dimension between the outermost wires 12 and 16 and the trimmed edges 22 and 24, respectively, of web 10.

The control means shown schematically in FIG. 1 are provided to move the carriages 30 and 32 (and blades 26 and 28) laterally as is necessary to maintain the aforesaid constant predetermined dimension. It is to be understood that the control means comprises duplicate control systems 36 and 38 for regulating the position of the carriages 30 and 32, respectively. However, only control system 36 will be described in detail hereinafter.

Control system 36 for carriage 30 comprises detector means such as detector head 40, best seen in FIGS. 1 and 2, which is rigidly mounted on carriage 30 in fixed position with respect to blade 26 and spaced a short distance therefrom in the direction of web travel. In practice, it is desirable that the distance between the cutting edge of blade 26 and detector head 40 be on the order of about 6 inches or less. Detector head 40 is located adjacent trimmed edge 22 of web 10 and its face normally spaced about .05 inch from the outside of outermost wire 12. As FIG. 2 shows, detector head 40 comprises a housing 42, a coil holder 44 mounted within housing 42 and preferably made of aluminum, and a non-conductive coil form 46 mounted within coil holder 44. A pancake-wound detector or oscillator coil 48 is mounted on coil form 46 at the face of detector head 40 and is provided with a pair of leads 48a and 48b which extend through housing 42 to a terminal block 47 of detector head 40 to which suitable connections are made when the head is mounted on carriage 30. A heater coil or element 50 is disposed on coil holder 44 and is provided with a pair of leads 50a and 50b which extend through housing 42 to terminal block 47. Temperature-sensing means such as a thermistor 52 is disposed in a cavity 54 in coil holder 44 closely adjacent to oscillator coil 48 and is provided with a pair of leads 52a and 52b which extend through housing 42 to terminal block 47.

Oscillator coil 48 operates on the principle that an electrically-conductive substance, such as outermost wire 12, which is brought into the field of the energized coil takes energy from the coil and dissipates it as an eddy current loss. This results in a decrease in the amplitude of the oscillation of coil 48 since the apparent Q of the coil is decreased. This change in amplitude is proportional to the distance of coil 48 from wire 12, i.e., the smaller the distance, the greater the losses and ultimately the lower the oscillator amplitude. In practice, the oscillation frequency of coil 48 is set high enough so that significant eddy current losses will be produced even with electrically conductive substances of small dimension, such as wire 16. In an actual embodiment, oscillator coil 48 was designed to operate approximately in the 1 to 2 mHz. range.

As FIG. 3 shows, circuit means are provided to energize oscillator coil 48, to detect changes in the amplitude of the oscillation of the coil and to provide control signals which are related to distance and which are used to perform appropriate control functions. Such circuit means take the form of an oscillator circuit 56 for energizing coil 48, an amplitude integrator circuit 58 to detect variations in the amplitude of oscillation of coil 48 and to integrate these variations into signals proportional to distance, and an amplifier circuit 60 for amplifying these control signals to a usable form.

Figure 4:
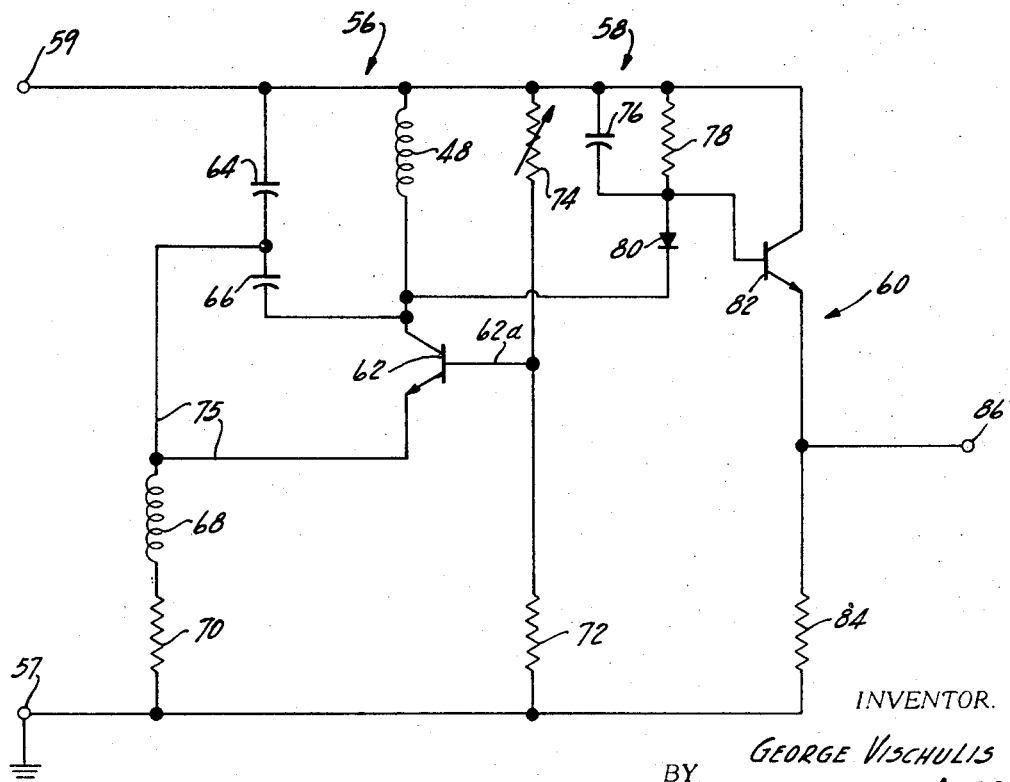
FIG. 4 is a circuit diagram of a portion of the control system shown in FIG. 3.

Referring to FIG. 4, oscillator circuit 56 takes the form of a Colpitts-type oscillator and comprises oscillator coil 48 which is connected in series with the collector-emitter circuit of a transistor 62, an induction coil 68 and a resistor 70 across the output terminals 59 and 57 of a 10 volt D.C. power supply unit 61, shown in FIG. 3. Transistor 62 serves as the oscillator coil amplifying element. A pair of series-connected capacitors 64 and 66 is connected in parallel with coil 48 to form a resonant "tank" circuit which determines oscillation frequency of coil 48. The small isolation inductance coil 68 in series with the collector-emitter circuit of transistor 62 and the tank circuit permits maximum amplitude of oscillation of coil 48 while providing a proper D.C. current path through resistor 70 to ground terminal 57 of power supply unit 61 for transistor 62. A pair of series-connected resistors 72 and 74 are connected across output terminals 59 and 57 of power supply unit 61 to form a biasing voltage divider for the base 62a of transistor 62 which is connected between the resistors 72 and 74. Resistor 74 is a potentiometer which can be adjusted so that the peak oscillation voltage can be set to a convenient level. The capacitors 64 and 66 also serve as an A.C. voltage divider network which provides the required feedback through conductor 75 to the emitter of transistor 62 for oscillation of coil 48.

Referring to FIG. 4, amplitude integrator circuit 58 comprises a capacitor 76 in parallel with a resistor 78 and both are connected in series with a diode 80 between output terminal 59 of power supply unit 61 and the collector of transistor 62. Circuit 58 is, in effect, a half-wave rectifier which attempts to charge up to peak input voltage in response to the output from oscillator circuit 66. Variations in the output from amplitude integrator circuit 58 are used to bias a transistor 82 which has its emitter-collector circuit connected in series with a resistor 84 across the output terminals 59 and 57 of power supply unit 61. Transistor 82 has its base 82a connected to circuit 58 and serves as the current amplifier circuit 60 of the emitter-follower type. The amplified output signal from amplitude integrator circuit 58 appears at a control signal terminal 86 of amplifier circuit 60 as a unipolar signal voltage variable in amplitude to correspond to the size of the gap sensed by oscillator coil 48 between it and outermost wire 12.

It is to be understood, for example, that power supply unit 61 provides an output of 10 volts direct current across its output terminals 57 and 59 and that the signal voltage at control signal terminal 86 is a DC signal of positive polarity which has a voltage of 5 volts when the size of the gap between detector head 40 and outermost wire 12 is of a predetermined desired size, thereby indicating that proper cutting is taking place. The voltage at control signal terminal 86 with respect to common increases as the size of the gap decreases and the voltage decreases as the size of the gap increases. In the arrangement shown, voltage at control signal terminal 86 can increase or decrease about 4 volts in either direction from the normal voltage of 5 volts.

As FIG. 3 shows, temperature control unit 91 is provided to supply current to heater coil 50 and to regulate the amount of current supplied in response to heat sensor 52. Temperature control unit 91 has power input terminals 93 and 95 which are connected to the power supply terminals 59 and 57, respectively, of power supply unit 61. A power output terminal 97 of temperature control unit 91 is connected to one side of heater coil 50 and the other side of heater coil 50 is connected to output terminal 57 of power supply unit 61. Heater coil 50 maintains oscillator coil 48 at a temperature well above ambient temperature so that changes in ambient temperature will not affect the sensitivity or the output of coil 48. Heater coil 50 is maintained at a constant temperature by varying the amount of current supplied thereto from temperature control unit 91. The current at terminal 97 of temperature control unit 91 is regulated in response to heat sensor or thermistor 52 which has one side connected to sensor input terminal 99 of temperature control unit 91. The other side of heat sensor 52 is connected to power supply terminal 57 of power supply unit 61. Temperature variations in detector head 40 are sensed by heat sensor 52 and an appropriate control signal is sent to temperature control unit 91 to regulate the heat output of heater coil 50.

Referring to FIG. 3, means are provided in control system 36 for receiving and utilizing the control signal appearing at control signal terminal 86 to effect any movement of carriage 30 necessary to maintain blade 26 at the desired predetermined distance from outermost wire 12 in web 10, thereby insuring that a constant predetermined dimension exists between wire 12 and trimmed edge 22. Such means comprise a servo-drive circuit, including a drive signal amplifier 90, a driver 91 and a drive power amplifier 92, a servo-motor 94, and means such as a screw drive mechanism 96, shown in FIG. 1, which is driven by servo-motor 94 to move carriage 30. Drive signal amplifier 90 is energized from a power supply 98 which, for example, provides 13 volts of regulated DC power. Drive power amplifier 92, driver 91 and servo-motor 94 are energized from a power supply 102 which, for example, provides 50 volts of regulated DC power for a 50 volt motor.

Servo-motor 94 comprises a field winding 104 and an armature 106. Field winding 104 is maintain at constant polarity and the direction of rotation of armature 106 is determined by the polarity of a DC voltage supplied to it. The speed of rotation of armature 106 is determined by the magnitude of the voltage supplied to it. It may be assumed, for example, that armature 106 of servo-motor 104 is rotatable in the forward direction (when positive voltage is supplied) to rotate screw drive 96 so as to move carriage 30 toward web 10 and that the armature is rotatable in the reverse direction (when negative voltage is supplied) to move the carriage away from the web. When rotating in either direction, armature 106 produces a back EMF (electromotive force) which is proportional to its speed of rotation and this back EMF is usable as a feedback signal to assist in controlling motor speed, as hereinafter described.

Power supply 98 has a positive output terminal 98a and a negative output terminal 98c which are connected through a conductor 110 and a conductor 112, respectively, to a power terminal 90a and a power terminal 90b respectively, on drive signal amplifier 90.

Drive signal amplifier 90 is provided with an inverting signal input terminal 90c which is connected through a conductor 113 to control signal terminal 86 and with a non-inverting signal terminal 90d which is connected to ground.

A servo-null potentiometer 114 is provided to bias signal input terminal 90c of drive signal amplifier 90 to zero when the output voltage at control signal terminal 86 is 5 volts. As hereinbefore explained, a 5 volt signal at control signal terminal 86 indicates that proper spacing exists between detector head 40 and outermost wire 12 of web 10 and, therefore, no adjustment of carriage 30 is necessary. Accordingly, the output from drive signal amplifier 90 must also be zero so that servo-motor 94 will not rotate in either direction. Servo-null potentiometer 114 comprises a resistance element 114a which is connected between negative output terminal 98c of power supply 98 and a ground or common terminal 98b of power supply 98. The pickoff element 114b of servo-null potentiometer 114 is connected to signal input terminal 90c of drive signal amplifier 90.

Driver 91 comprises an NPN-type transistor 118 and a PNP-type transistor 120 which are connected in common emitter configuration. With a 5-volt signal at control signal terminal 86 (but biased to zero at signal input terminal 90c of drive signal amplifier 90), both transistor 118 and 120 are biased to "off" or non-conductive condition. The emitter 118b and 120b of the transistor 118 and 120, respectively, are both connected to ground through a conductor 122. The bases 118a and 120a are connected to output terminal 90e of drive signal amplifier 90. Collector 118c of transistor 118 is connected to a positive input terminal 92a of drive power amplifier 92. Collector 120c of transistor 120 is connected to a negative input terminal 92b of drive power amplifier 92. Drive signal amplifier 90 produces no output at its terminal 90e and both the transistors 118 and 120 are biased "off"

when detector head 40 senses a proper gap between it and outer-most wire 12 in web 10.

Drive power amplifier 92 comprises two transistors 124 and 126 and a power output terminal 128. Drive power amplifier 92 produces no power output at its terminal 128 when both transistors 124 and 126 are biased "off," i.e., when drive signal amplifier 90 is producing no output, as hereinbefore explained. When drive power amplifier 92 produces no output, armature 106 of servo motor 94 is de-energized. Transistor 124 has its base 124a connected to positive input terminate 92a of drive power amplifier 92. The emitter 124b of transistor 124 is connected to a power input terminal 92c from terminal 102c of power supply 102. The collector 124c of transistor 124 is connected to the collector 126c of another power transistor 126 in drive power amplifier 92, which forms the "push-pull" output of amplifier 92 at terminal 128. The base 126a of transistor 126 is connected to negative input terminal 92b of power drive amplifier 92. The emitter 126b of transistor 126 is connected to a power input terminal 92d from terminal 102d of power supply 102. The collector 124c and 126c of transistors 124 and 126, respectively, are both connected to a drive power terminal 128 on drive power amplifier 92. Power supply 102 has a negative output terminal 102a which is connected to terminal 92d of power drive amplifier 92. A ground terminal 102b of power supply 102 is connected to ground or common. A positive output terminal 102c of power supply 102 is connected to terminal 91c of power drive amplifier 92 and also to one side of field winding 104 of servo-motor 94 through a conductor 130. The other side of field winding 104 is connected to ground. Power output terminal 128 of power drive amplified 92 is connected to one side of armature 106 of servo-motor 94. The other side of armature 106 is connected to ground.

A feedback conductor 132 is connected between drive power output terminal 128 of drive power amplifier 92 and signal input terminal 90c of drive signal amplifier 90 to deliver the feedback signal from armature 106 of servo-motor 94 to drive signal amplifier 90.

Web-trimming apparatus and control means therefor in accordance with the invention operate as follows. Referring to FIG. 1, assume that web 10 is traveling through the web-trimming apparatus in the direction of arrow 19 and that both carriages 30 and 32 are positioned so that proper cutting is taking place along both edges of the web. Further assume that both control systems 36 and 38 are energized and in operation. For purposes of simplification, only the operation of control system 36 will be described hereinafter, but it is to be understood that control system 38 would operate in a similar manner.

Detector head 40 on carriage 30 senses that its assoociated blade 26 is performing a proper cut and that the blade is being maintained a constant first predetermined distance from outermost wire 12 and that detector head 40 itself is being maintained at its constant second predetermined distance from outermost wire 12. Consequently, a constant predetermined dimension is being maintained between outermost wire 12 and trimmed edge 22. In this situation, the amplitude of oscillator coil 48 in detector head 40 remains constant at a desired level and the control signal at control signal terminal 86, shown in FIG. 3, is maintained at the level of 5 volts positive polarity. It is to be assumed that servo-null potentiometer 114 has been set so that zero voltage appears at signal input terminal 90c of drive signal amplifier 90. In this condition, then, both transistors 118 and 120 in driver 91 are biased to "off" condition and no drive signals are being presented to terminals 92a and 92b of drive power amplifier 92. Thus, both transistors 124 and 126 in drive power amplifier 92 are also biased to a non-conductive condition and no drive power appears at drive power terminal 128 of drive power amplifier 92. As a result, armature 106 of servo-motor 94 does not rotate in either forward or reverse direction to rotate screw drive mechanism 96 and carriage 30 remains stationary.

Now assume that the uppermost end of web 10 begins to slew toward the right, with respect to FIG. 1, and that, as a result, blade 26 would begin to cut too close to outermost wire 12 unless corrective action is taken. In this situation, it is necessary that carriage 30 be moved toward the right or outwardly, with respect to FIG. 1, to maintain proper cutting. As web 10 slews to the right, oscillator coil 48 senses that outermost wire 12 is moving closer to detector head 40 because such movement of the wire causes a change in the amplitude of oscillation voltage in the oscillator coil. This change in amplitude causes an increase in voltage of the control signal at control signal terminal 86 which is proportional to the change (reduction) in the size of the gap between detector head 40 and outermost wire 12. The increase in signal voltage at control signal terminal 86 causes PNP transistor 120 in driver 91 to turn "on" and a positive voltage with respect to 92d on terminal 92b biases transistor 126 in power drive amplifier 92 to "on" and current is permitted to flow from terminal 102a of power supply 102, through terminal 92d, through the emitter-collector circuit of transistor 126, to power output terminal 128 of drive power amplifier 92 and to armature 106 of servo-motor 94. Armature 106, being energized by the negative output at 128, then rotates in the reverse direction to cause screw drive mechanism 96 to rotate and move carriage 30 outwardly or to the right with respect to FIG. 1. Such rightward movement of carriage 30 moves knife 26 to the correct cutting position and also moves detector head 40 to its properly-spaced position with respect to outermost wire 12.

As hereinbefore mentioned, the direction of rotation of servo-motor 94 is determined by which of the transistors 124 and 126 in drive power amplifier 92 is "on." The speed of rotation of armature 106 of servo-motor 94 is controlled by the degree to which the power transistors 124 or 126 are conductive. Thus, the degree to which transistor 126 is conductive and, consequently, the speed of rotation of armature 106 in the reverse direction is determined by the magnitude of the bias voltage applied to base 126 of power transistor 126 in drive power amplifier 92. This, in turn, is governed by the extent to which PNP transistor 120 in drive 91 is conductive. The degree of conductivity of transistor 120 is governed by the magnitude of the bias voltage applied to its base 120a. The bias voltage applied to base 120a of transistor 120 is a function of both the voltage level of the control signal at control signal terminal 86 and the voltage level of the feedback signal produced by armature 106 of servo-motor 94 and presented to input terminal 90c of amplifier 90 through feedback conductor 132. Faster rotation of armature 106 of servo-motor 94 results in an increase in feedback signal voltage and greater biasing of base 120a of PNP transistor 120. However, this increase in bias is offset by the decrease in the voltage level at control signal terminal 86 which occurs as carriage 30 moves to the right (with respect to FIG. 1) and detector head 40 moves away from outermost conductor 12. Thus, when carriage 30 finally reaches a position where correct spacing exists between knife 26 and outermost wire 12, normal conditions again exist and the voltage at control signal terminal 86 returns to its normal level of 5 volts positive.

It is to be understood that corrective movement inwardly of carriage 30 to the left (with respect to FIG. 1) necessitated by leftward slewing of web 10, will be effected by forward rotation of armature 106 of servo-motor 94. Forward rotation of armature 106 results when coil 48 in detector head 40 senses leftward movement of wire 12 and web 10 and ultimately causes operation of both NPN transistor 118 in driver 91 and power transistor 124 in power drive amplifier 92. Operation of NPN transistor 118 in driver 91 and power transistor 124 in power drive amplifier 92 reflects an increase in the distance between outermost wire 12 and detector head 40. Such an increase in distance causes the voltage at control signal terminal 86 to increase from the standard or normal 5 volt positive level. Aside from these differences, control system 36 operates in substantially the same manner as hereinbefore described when effecting corrective inward movement of carriage 30.

To recapitulate, the web-trimming apparatus and control means therefor are used for trimming excess material from both edges of web of material 10, such as rubber tire webbing which has closely-spaced electrically conductive steel wires 12, 14 and 16 embedded in the web generally parallel to said edges. It is necessary to provide trimmed edges 22 and 24 which are spaced predetermined constant distances from the outermost steel wires 12 and 16, respectively. The slitting means for trimming excess material from the web edges comprises a pair of laterally movable carriages 30 and 32 and each carriage carries a blade, such as blade 26, which is normally spaced a first predetermined distance from its associated outermost wire 12 or 16. Each blade 26 and 28 is movable laterally with its carriage 30 and 32, respectively, toward and away from its associated outermost wire 12 and 16, respectively, to maintain the first predetermined distance constant. Web 10 moves or is pulled relative to the blades 26 and 28 to effect slitting. Control means comprising a pair of identical control systems 36 and 28 are provided to effect corrective movements of the carriage 30 and 32. Control system 36, for example, comprises a detector head 40 including an oscillator coil 48 mounted on carriage 30 and located adjacent its associated trimmed edge 22 and spaced from blade 26 in the direction of web travel. Detector head 40 normally is spaced a second predetermined distance from outermost wire 12 and is movable laterally toward and away from that wire by carriage 30 to maintain the second predetermined distance constant. Control system 36 also comprises circuit means including oscillator circuit 56, amplitude integrator circuit 58 and amplifier circuit 60, connected to oscillator coil 48 and is responsive to a change in the aforesaid second predetermined distance to provide a control signal at terminal 86 which is proportional to this change. Control system 36 finally comprises drive means including drive signal amplifier 90, driver 91 and drive power amplifier 92 connected to control signal terminal 86 and responsive to the voltage level of the control signal to energize servo-motor 94 to move carriage 30 laterally to maintain the first and second predetermined distances constant.

I claim:

1. Web-trimming apparatus and control means therefor for trimming excess material from at least one edge of a web of material having at least one electrically conductive wire embedded in the web generally parallel to said edge to provide a trimmed edge a predetermined distance from said wire comprises:

slitting means for trimming excess material from said edge, said slitting means normally being spaced a first predetermined distance from said wire and being movable laterally toward and away from said wire to maintain said first predetermined distance constant, means for moving said web relative to said slitting means to effect slitting, detector means located adjacent said trimmed edge and spaced from said slitting means in the direction of web travel, said detector means normally being spaced a second predetermined distance from said wire and being movable laterally toward and away from said wire to maintain said second predetermined distance constant, circuit means connected to said detector means and being responsive to a change in said second predetermined distance to provide a control signal proportional to said change, and drive means connected to said circuit means and responsive to said control signal to move said slitting means and said detector means laterally to maintain said first and second predetermined distances constant.

2. Apparatus and control means according to claim 1 wherein said detector means and said slitting means move laterally simultaneously in the same direction and for the same distance.

3. Apparatus and control means according to claim 2 including a laterally-movable supporting structure on which said detector means and slitting means are mounted.

4. Apparatus and control means according to claim 1 wherein said detector means comprises an oscillator coil which exhibits changes in the amplitude of its frequency as the relative distance between said coil and said wire changes.

5. Apparatus and control means according to claim 4 wherein said circuit means comprises an oscillator circuit in which said oscillator coil is connected and further comprises an amplitude integrator circuit which provides said control signal at a control signal terminal.

6. Apparatus and control means according to claim 5 wherein said drive means comprises a servo-drive circuit connected to said control signal terminal and a servo-motor energizable for rotation in opposite directions by said servo-drive circuit to move said slitting means and said detector means.

7. Apparatus and control means according to claim 6 including a laterally-movable supporting structure on which said detector means and said slitting means are mounted, and wherein said drive means comprises a screw drive mechanism drivable by said servo-motor to move said supporting structure.

8. Apparatus and control means according to claim 7 wherein said servo-drive circuit comprises a drive signal circuit connected to said control signal terminal and further comprises a drive power circuit connected to said drive signal circuit and to said servo-motor.

9. Apparatus and control means according to claim 4 wherein said detector means comprises a detector head in which said oscillator coil is mounted and a heater element mounted on said head for maintaining said oscillator coil at a constant temperature so that performance of the oscillator coil is not affected by changes in ambient temperature.

10. Apparatus and control means according to claim 9 including a heat-sensing device on said head for regulating said heater element.

11. Web-trimming apparatus and control means therefor for trimming excess material from both edges of a web of material having electrically conductive wires embedded in the web generally parallel to said edges to provide trimmed edges which are spaced predetermined distances from the outermost wires comprises:

slitting means for trimming excess material from said edges, said slitting means comprising a pair of movable carriages, each carriage having a blade which is normally spaced a first predetermined distance from its associated outermost wire and being movable laterally with its carriage toward and away from said associated outermost wire to maintain said first predetermined distance constant, means for moving said web relative to said slitting means to effect slitting, and control means comprising a pair of control systems, each control system being provided to effect movement of one carriage and each control system comprising:

a detector head mounted on its respective carriage and located adjacent its associated trimmed edge and spaced from its associated blade in the direction of web travel, said detector head normally being spaced a second predetermined distance from its associated outermost wire and being movable laterally toward and away from said associated outermost wire to maintain said second predetermined distance constant, circuit means connected to said detector head and being responsive to a change in said second predetermined distance to provide a control signal proportional to said change, and drive means connected to said circuit means and responsive to said control signal to move its respective carriage laterally to maintain said first and second predetermined distances constant.

References Cited

UNITED STATES PATENTS

| | | | |
|---|---|---|---|
| 1,762,826 | 6/1930 | Lehman | 83—359 |
| 2,675,437 | 4/1954 | Theobald | 83—74 X |
| 3,008,864 | 11/1961 | Macklem et al. | 83—368 X |

JAMES M. MEISTER, Primary Examiner

U.S. Cl. X.R.

83—170, 358, 368